No. 870,278. PATENTED NOV. 5, 1907.
J. N. EMLEY.
COOLING SYSTEM FOR AUTOMOBILE ENGINES.
APPLICATION FILED FEB. 17, 1906.
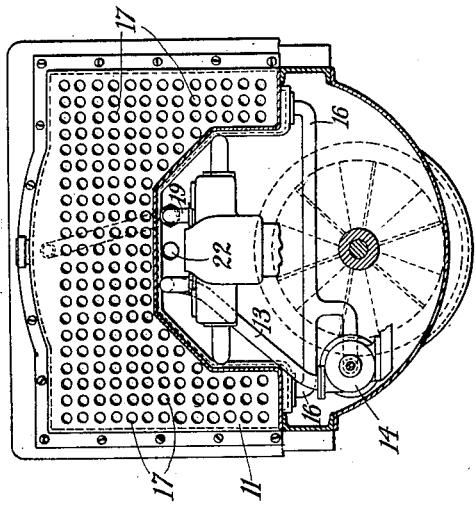
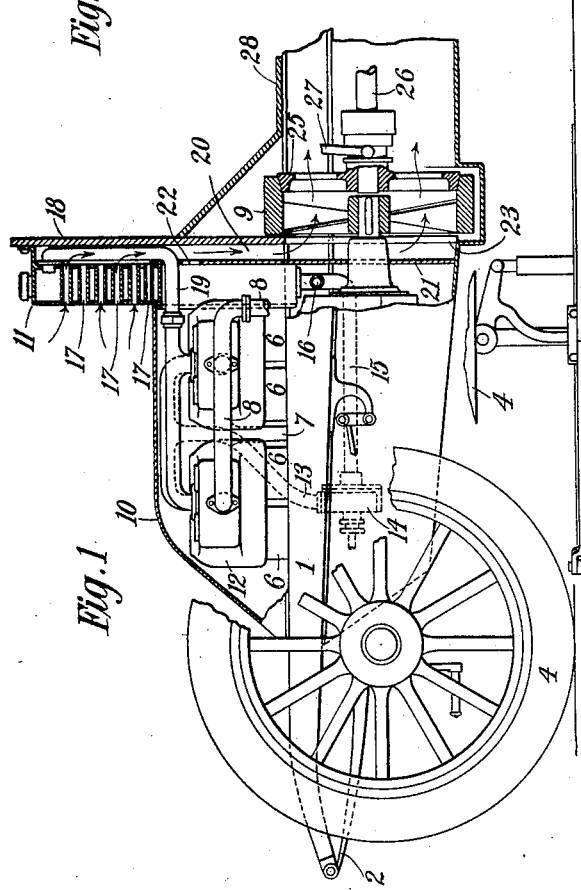
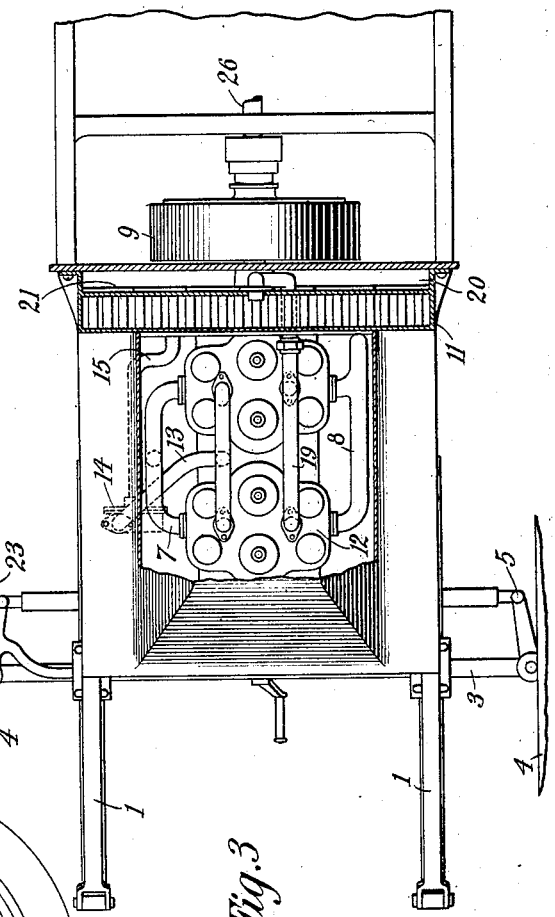
Witnesses
Raphaël Netter
Julian T. Wooster
Jay Noble Emley   Inventor
By his Attorney  C. W. Edwards

UNITED STATES PATENT OFFICE.

JAY NOBLE EMLEY, OF NEW YORK, N. Y.

COOLING SYSTEM FOR AUTOMOBILE-ENGINES.

No. 870,278.            Specification of Letters Patent.            Patented Nov. 5, 1907.

Application filed February 17, 1906. Serial No. 301,528.

*To all whom it may concern:*

Be it known that I, JAY NOBLE EMLEY, a citizen of the United States, residing at New York, in the county of New York and State of New York, have invented certain new and useful Improvements in Cooling Systems for Automobile-Engines, of which the following is a full, clear, and exact specification.

This invention relates to cooling systems for automobile engines, and more particularly has reference to automobiles having a water cooled explosion engine, a water circulating system and a radiator for cooling the water. The arrangement commonly used is such that the air after passing through the radiator passes directly through the hood and over the exposed parts of the engine, and thence out. This construction is objectionable because the air which passes through the radiator contains much dust and grit, which is deposited on the engine parts, causing damage to the valves and bearings and necessitating frequent cleaning.

The object of this invention is to provide a cooling system wherein the current of air which cools the radiator passes outside the engine casing and parts, and at the same time to also prevent overheating of the engine by permitting the heated air in the engine compartment to be exhausted without exposing the engine to dust and grit.

A further object of the invention is to generally improve the construction and arrangement of automobile cooling systems, as will be more fully described in connection with the accompanying drawings, wherein, Figure 1 represents a side elevation of a portion of an automobile embodying my invention, Fig. 2, a front end elevation, and Fig. 3 a top plan view.

1, 1, represent the side frames, 2, 2, the front springs, 3 the front axle, 4, 4 the front wheels pivotally mounted on the axle, and 5 the steering gear, all of any suitable construction.

6, 6, 6, 6 are explosion engine cylinders, 7 being the inlet pipe, 8 the exhaust pipe, 9 the flywheel, 10 the hood, and 11 the radiator. The carbureter, valves and valve actuating mechanism, transmission and other parts, not shown, are of such construction as may be desired.

The invention is shown embodied in a system having forced draft of both the water and the air. The water circulating system leads from the radiator 11 through pipe 15 having branches 16 to a circulating pump 14 driven from the main shaft. From pump 14, pipe 13 leads to the water jacket 12. The radiator has a large number of air passages 17, of the well known "honeycomb type" or may be otherwise constructed so as to have a large cooling surface area. As will be seen from Figs. 1 and 2, the radiator is located at the rear of, and overlying the hood 10, being secured to the front of the dash 18, and shaped in general like an inverted U. From the water jacket 12 of the engine cylinder 6, pipe 19 leads back to the radiator 11, thus completing the water circulating system. Between the radiator and the dash 18, is a passage or chamber 20, which forms an air conduit opening rearwardly into the flywheel casing.

21 is a partition which closes communication between the engine compartment and passage 20 except at the top where an opening 22 is provided. The opening 22 may of course be located elsewhere than as shown in the drawing, as for example at the top or side of the hood, if preferred.

The lower end of passage 20 has a circular opening 23, of substantially the inner diameter of the flywheel rim, and the spokes of the flywheel are formed with inclined vanes 24 to act as a fan and produce a forced draft of the air through the radiator and out at the rear of the vehicle. When the vehicle is moving, a draft additional to the fan draft will be produced through the radiator.

25 is a clutch keyed on the intermediate shaft 26 and controlled by the shifter 27 to start and stop the vehicle, these parts being located under the floor 28 and provided with the usual connections for operating from above.

It will be seen that any draft of air in passage 20 will induce slower circulation through the engine casing and out at opening 22, the heated air drawn out being replaced by cooler air drawn in through openings in or around the hood, it being customary to fit the hoods loosely to permit easy removal. By suitably locating the air passage 22 in the hood, adjacent to or in front of the radiator openings, the heated air will be withdrawn from the engine compartment in the same manner but will pass through some of the radiator openings to reach the conduit 20, so that I do not restrict myself to any particular location of the opening 22.

The draft through the engine casing will at no time be as strong as that through the radiator openings, but will be sufficient to prevent the accumulation of heat in the engine casing to such an extent as to become objectionable. Furthermore the hotter this air becomes, the more easily will it be drawn out over the engine through the opening 22, thus maintaining a substantially constant temperature in the engine compartment. There will thus be no loss in efficiency of the engine by too rapid cooling, and the draft through the radiator will be kept entirely independent of the draft within the engine casing without producing any back pressure in the air passages. At the same time, the engine will be protected by the hood against dust and grit. Inasmuch as the radiator with its contained water, and the piping is quite heavy, a vehicle provided with my invention will be more easy running because of the disposition of this weight nearer the middle of the body, instead of over the front axle, and the engine will be more readily accessible.

It will be understood that modifications and changes in specific details and arrangements may be made according to the particular construction of vehicle, without departure from the scope of my invention, and I do not restrict myself to the exact construction shown and described.

Having thus described my invention, I declare that what I claim as new and desire to secure by Letters Patent, is,—

1. The combination of a vehicle frame having an engine compartment containing a water cooled engine, a radiator carried by said frame and outside said compartment, an air conduit leading from said radiator rearwardly of the vehicle, and means actuated by the engine for producing a draft of air through said radiator and conduit, said compartment having an opening whereby to permit air to be exhausted therefrom into said conduit, substantially as described.

2. The combination with an inclosed water cooled explosion engine and a radiator, of a single means for creating independent drafts through the engine compartment to cool the engine and through the radiator, substantially as described.

3. In an explosion engine cooling system, the combination with an inclosed water cooled engine and a radiator, of means for creating a draft through the radiator independently of the engine inclosure, said means also causing a separate draft through said engine inclosure, substantially as described.

4. In an explosion engine cooling system including a radiator and an engine compartment in which said engine is located, the combination of means for producing a current of air outside the engine casing through the radiator, and an air conduit therefor, of means whereby heated air from the engine compartment is withdrawn therefrom and discharged with the air from the radiator, substantially as described.

5. In an explosion engine cooling system including a radiator and an engine compartment containing said engine, the combination with means for producing a current of air through the radiator and with an air conduit therefor, of means whereby heated air from the engine compartment is withdrawn therefrom and discharged with the air from the radiator, said eduction air current being produced by the radiator air current, substantially as described.

6. In an explosion engine cooling system including a radiator, the combination with means for producing a current of air to cool the radiator, of a conduit for said air behind the radiator, an engine compartment separated from said conduit by a partition, said partition having an opening whereby to permit the engine compartment to be ventilated through said conduit, substantially as described.

7. In an explosion engine cooling system including a radiator, the combination with means for producing a current of air to cool the radiator, of a conduit for said air behind the radiator, and an engine compartment separated from said conduit by a partition, said compartment having an opening communicating with said conduit whereby to permit the engine compartment to be ventilated into said conduit, said current being produced by the air current in said conduit, substantially as described.

8. In an explosion engine cooling system including a radiator, the combination with a fan for producing a current of air to cool the radiator, of a conduit for said air behind the radiator, and an engine compartment separated from said conduit by a partition, said partition having an opening whereby to permit the engine compartment to be ventilated through said conduit by eduction, substantially as described.

9. In an explosion engine cooling system including a radiator, the combination with a fan for producing a current of air to cool the radiator, of a conduit for said air behind the radiator, an engine compartment separated from said conduit by a partition, said partition having an opening whereby to permit the engine compartment to be ventilated by eduction through said conduit, said fan being carried by the engine flywheel, substantially as described.

10. In an explosion engine cooling system including a radiator, the combination with said radiator of an air conduit leading rearwardly therefrom, a fan in said conduit, an engine compartment, and a ventilating passage from said engine compartment to said air conduit located at a point between the radiator and the fan, substantially as described.

11. In a vehicle, the combination with an explosion engine, and a compartment therefor, of a water cooling system for the engine, a radiator in said system disposed outside of said engine compartment, an air conduit leading from the radiator and located in part between said engine compartment and the vehicle dash, a fan carried by the engine flywheel and located in said conduit, and an opening from said engine compartment into said conduit and located at a point between the radiator and the fan, substantially as described.

12. In a vehicle, the combination with an explosion engine, and a compartment therefor, of a water cooling system for the engine, a radiator in said system disposed outside of said engine compartment, an air conduit leading from the radiator and located in part between said engine compartment and the vehicle dash, and a fan carried by the engine flywheel and located in said conduit, substantially as described.

In testimony whereof I affix my signature, in presence of two witnesses.

JAY NOBLE EMLEY.

Witnesses:
 HENRY A. RULNIR,
 CONRAD KREMP.